3,221,587
APPARATUS FOR FORMING AND DISPENSING FILTER ELEMENTS IN DEVICES FOR BREWING AND DISPENSING BEVERAGES

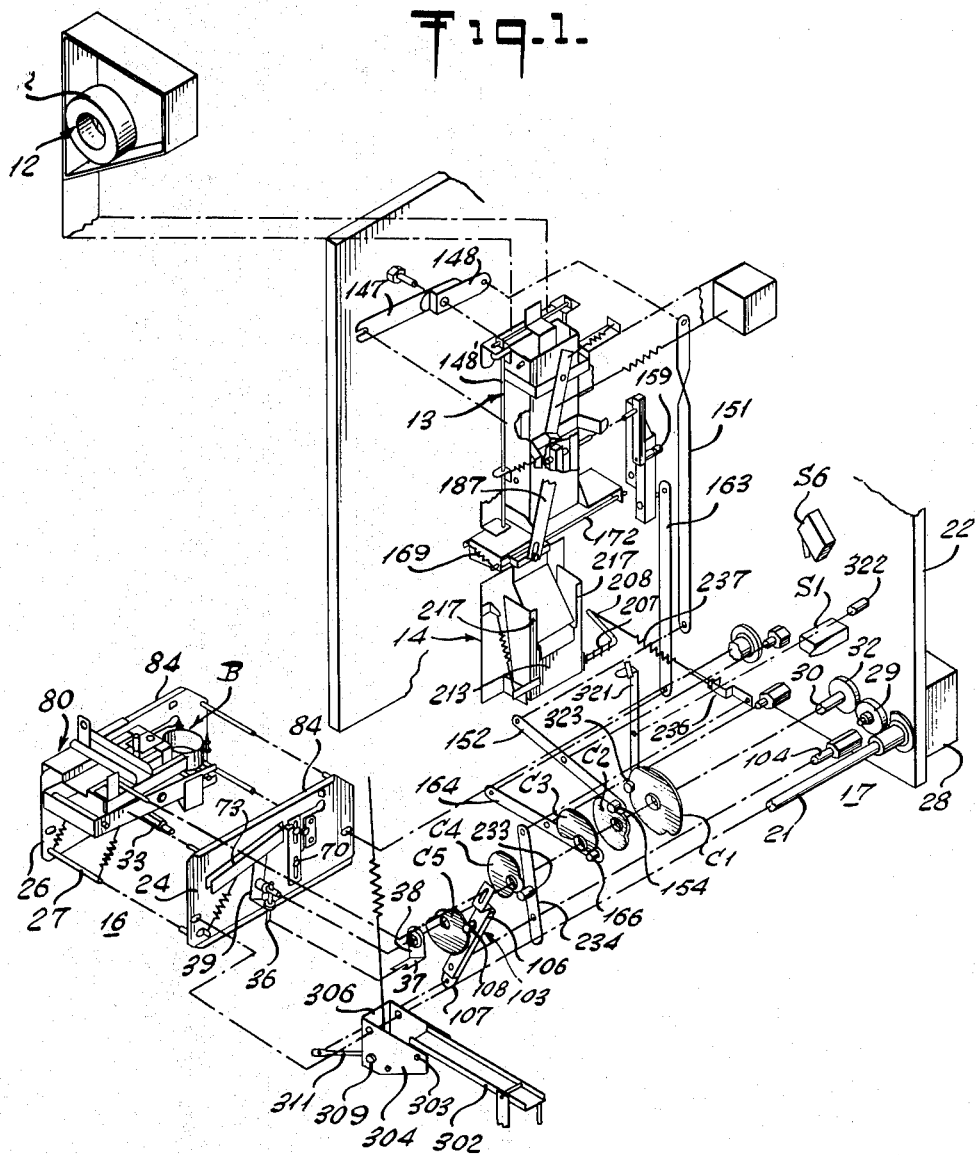

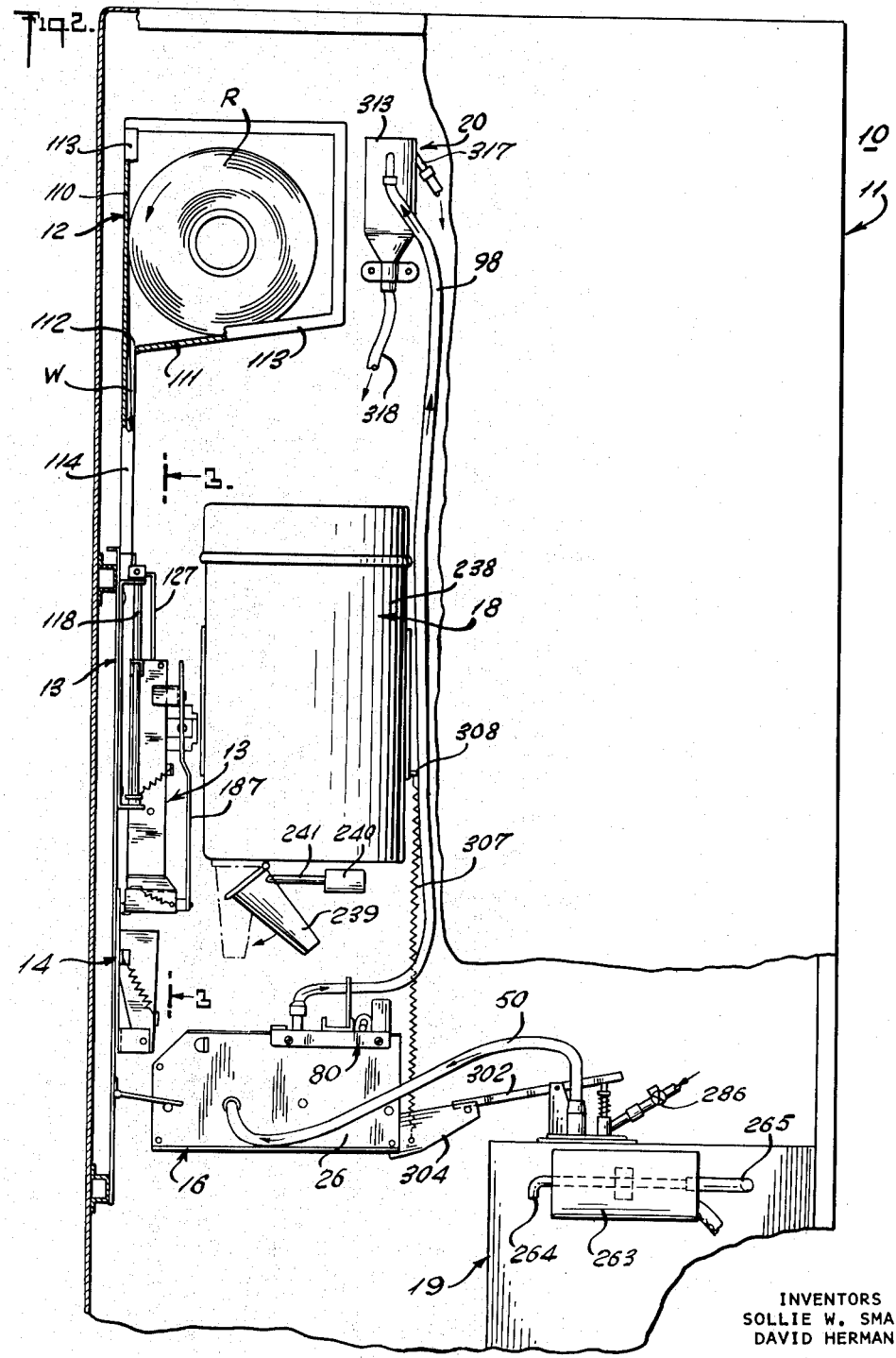

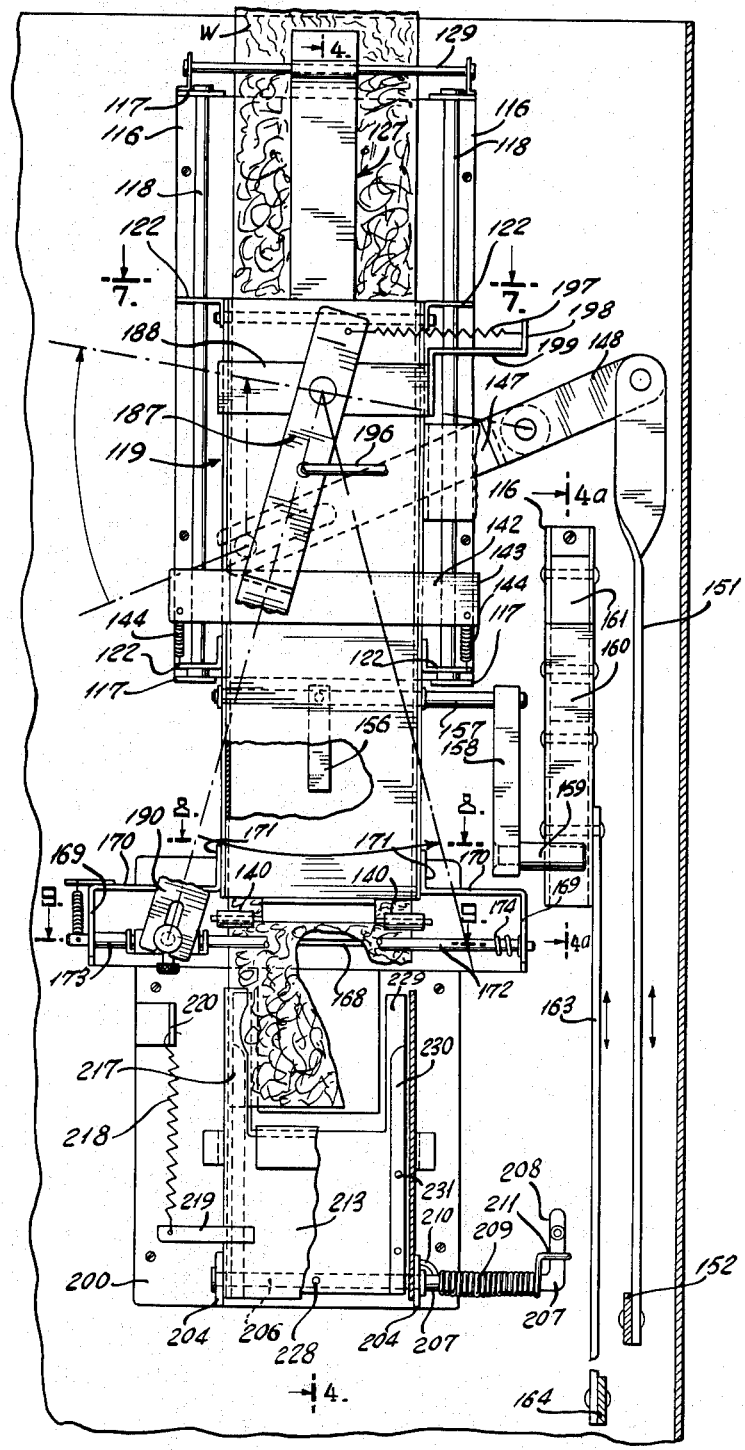

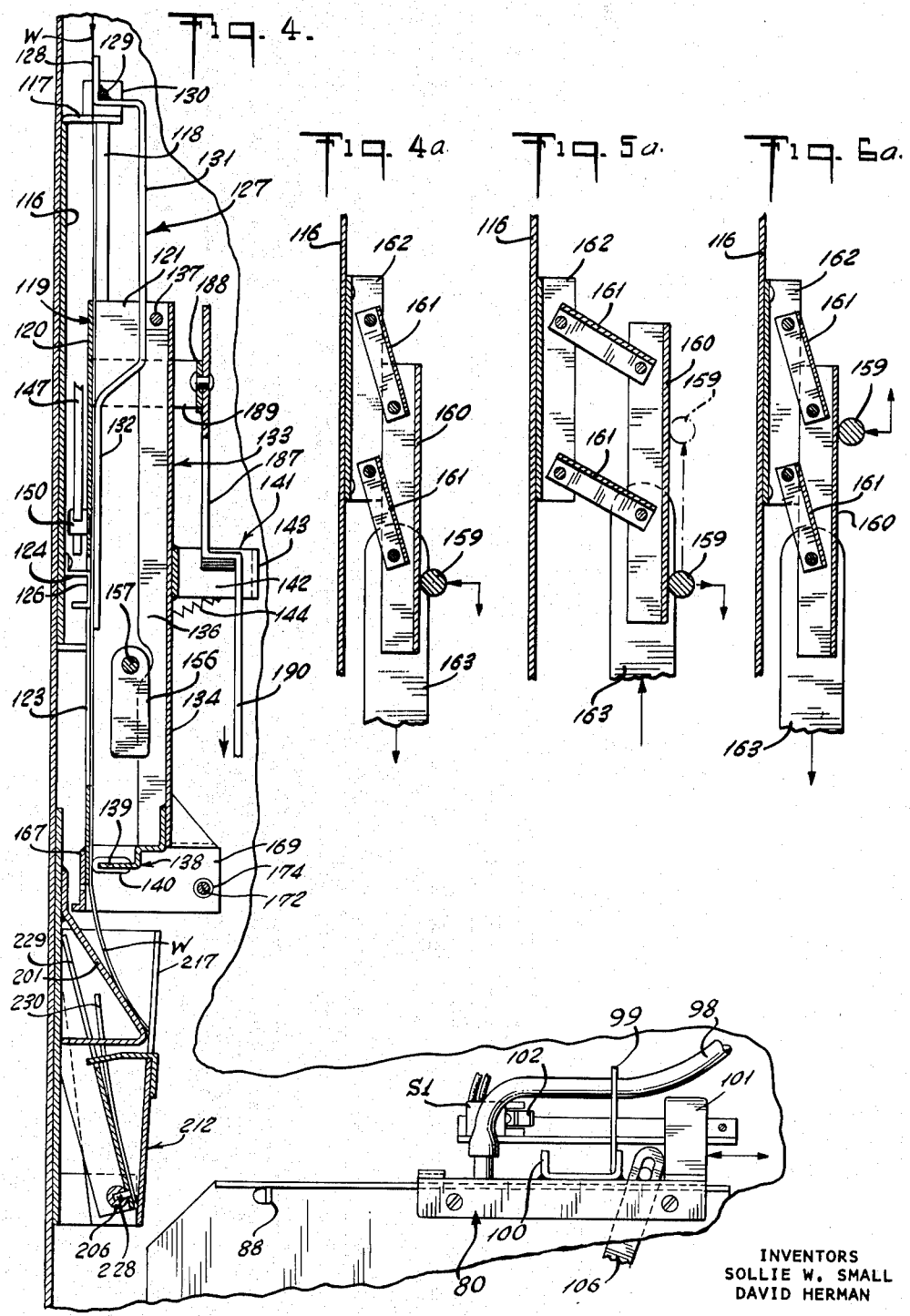

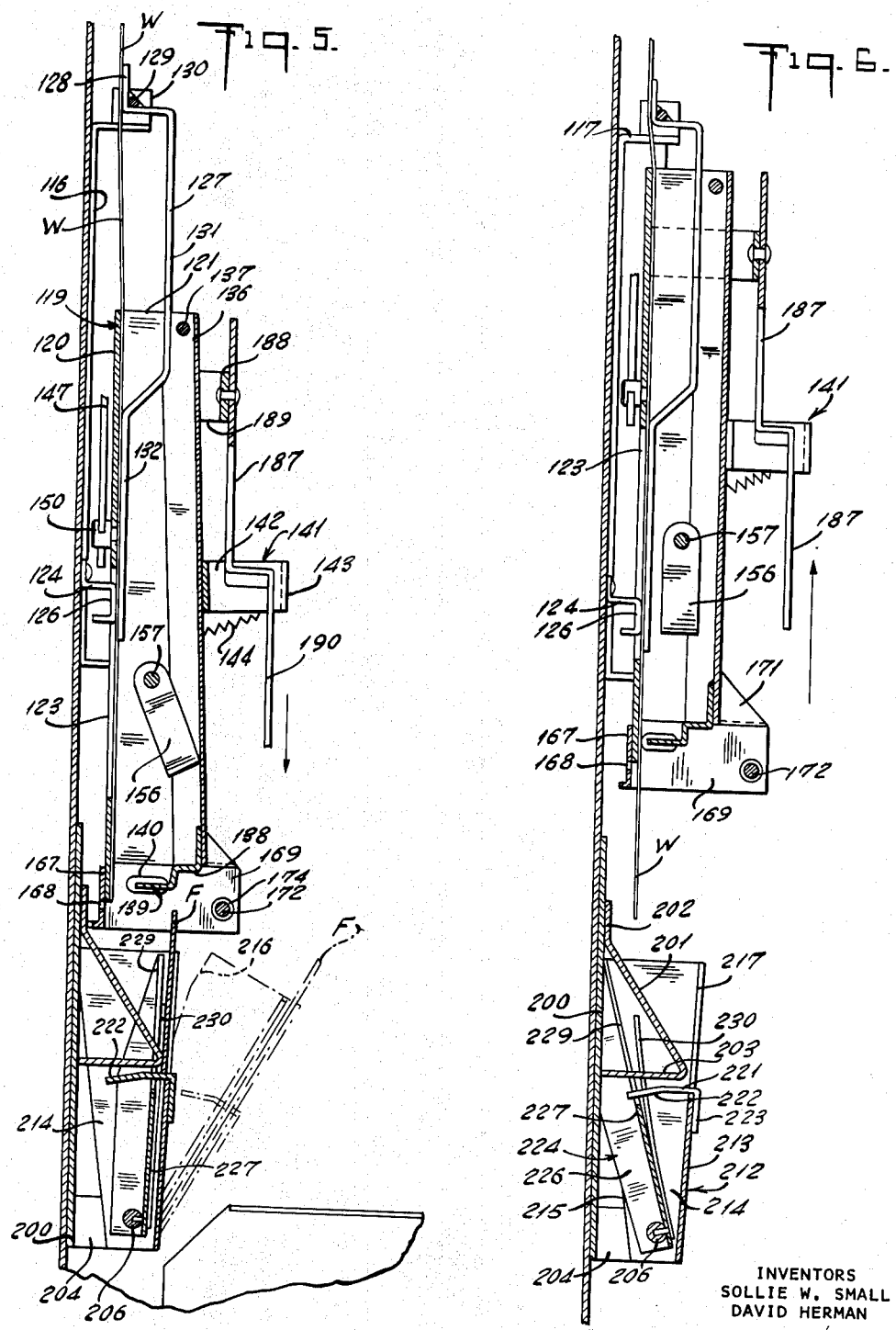

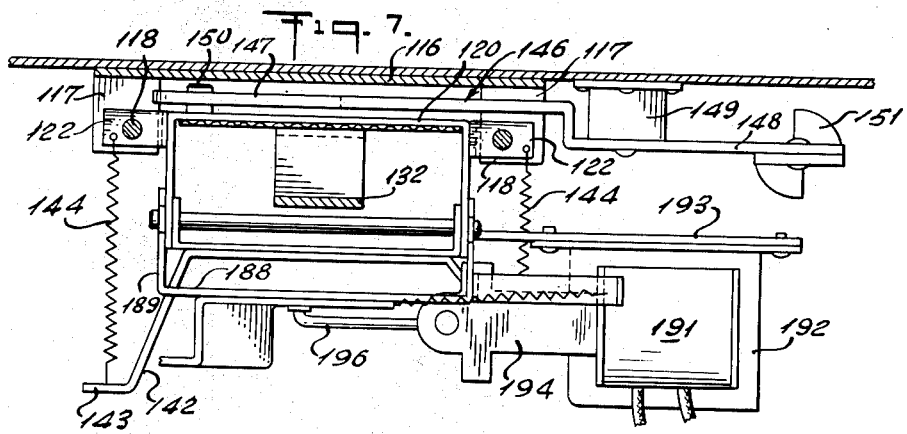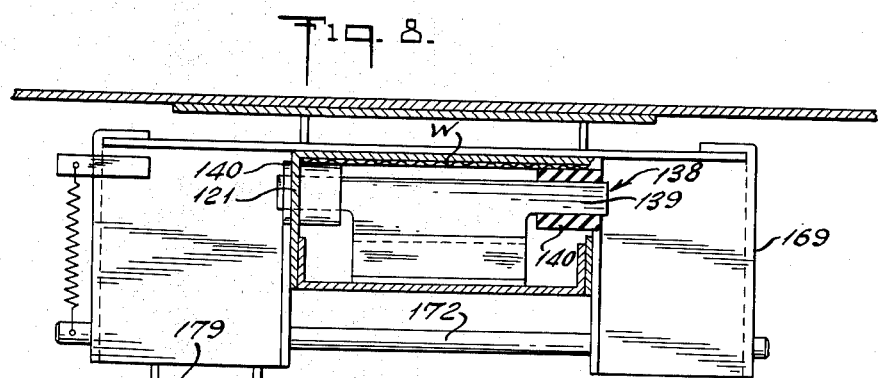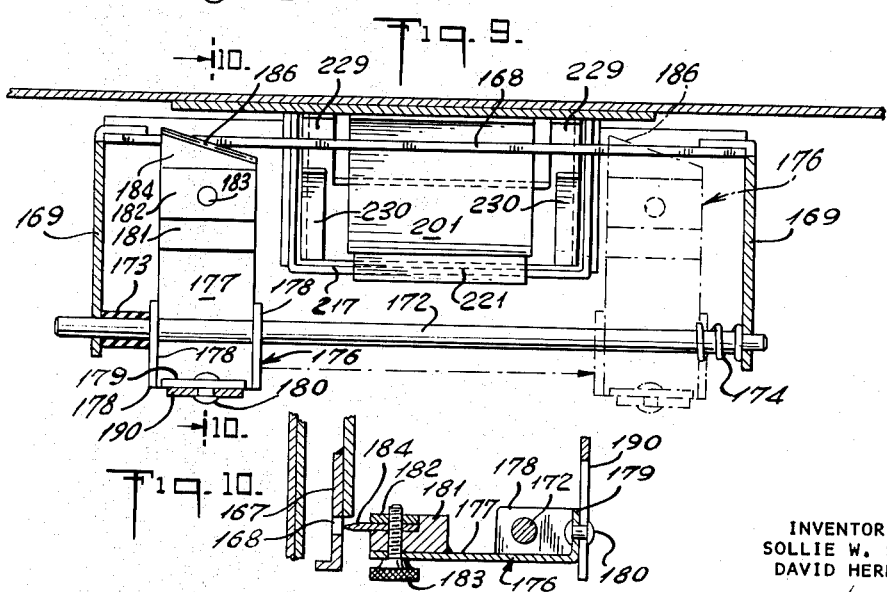

Sollie W. Small and David Herman, Newark, N.J., assignors to Coffee-Mat Corporation, Elizabeth, N.J., a corporation of New Jersey
Original application July 14, 1961, Ser. No. 124,207. Divided and this application July 29, 1964, Ser. No. 389,237
3 Claims. (Cl. 83—271)

The present invention relates generally to improvements in apparatus for the production of beverages, and it relates in particular to an improved apparatus for the brewing and dispensing of coffee beverage in unit quantities. This application is a divisional application of our copending case, Serial No. 124,207, filed July 14, 1961.

In the conventional hot coffee vending and dispensing machines, the coffee flavor is generally stored in the vending machine as a liquid coffee flavor concentrate or extract. Upon coin actuation of the vending machine, measured quantities of the coffee flavor and hot water are admixed as well as a sweetening material, also cream if preselected, and the resulting beverage is discharged into and dispensed in a cup. While the coffee vending machines heretofore employed and proposed operate satisfactorily from a mechanical point of view they leave much to be desired insofar as the quality of the end product is concerned. Not only is the flavor of the dispensed coffee generally inferior but it deteriorates with time and is non-uniform from cup to cup. This is in part an inevitable consequence of the use of coffee extracts and concentrates in preparing the beverage instead of freshly brewing the coffee from the coffee grounds. Another contributing fact to the inferior quality of the conventional machine vended coffee is the wide variation in the temperature of the beverage water which adversely affects the end product. While automatic coffee brewing and dispensing mechanisms have been proposed, these have been complex and costly, the prepared beverage has been expensive, and the machines possessed numerous drawbacks and disadvantages as is evidenced by the fact that they are not in commercial use to any appreciable extent.

A further object of the present invention is to provide improved automatic equipment for producing and dispensing a cup of coffee freshly brewed from the coffee grounds, in which a fresh filter element and fresh coffee grounds are employed for each cup of the beverage.

A further object of the present invention is to provide an improved coffee brewing apparatus in which a filter element is automatically formed from a strip of filter material with each cycle of the brewing operation.

A further object of the present invention is to provide a brewing apparatus of the above nature characterized by its ruggedness, simplicity, reliability of operation, flexibility, and high quality of the end product.

The above and other objects of the present invention will become apparent from a reading of the following description taken in conjunction with the accompanying drawings, wherein:

FIGURE 1 is a fragmentary perspective view of one form of the filter element forming and handling mechanism and the brew and sequence control assembly constructed in accordance with and embodying the present invention, parts being shown rotationally and laterally offset for convenience of illustration;

FIGURE 2 is a fragmentary front elevational view of the improved apparatus according to the present invention;

FIGURE 3 is a sectional view taken along line 3—3 in FIGURE 2, parts being shown partially broken away;

FIGURE 4 is a sectional view taken along line 4—4 in FIGURE 3;

FIGURE 4a is a sectional view taken along line 4a—4a in FIGURE 3;

FIGURES 5 and 6 are views similar to FIGURE 4 illustrating, however, the filter web advancing and transfer mechanism in successive operational positions;

FIGURES 5a and 6a are views similar to FIGURE 5, the web clamping mechanism control being illustrated in successive positions corresponding to FIGURES 5 and 6;

FIGURE 7 is a sectional view taken along line 7—7 in FIGURE 3;

FIGURE 8 is a sectional view taken along line 8—8 in FIGURE 3;

FIGURE 9 is a sectional view taken along line 9—9 in FIGURE 3; and

FIGURE 10 is a sectional view taken along line 10—10 in FIGURE 9.

Another important feature of the present invention is the filter element forming and dispensing apparatus comprising a slide member movable between an advanced and a retracted position, guide means directing a web of filter material along said slide member, web clamp means disposed adjacent the leading end of said slide member, means urging said web clamp means toward engaging the retraction thereof, and a stationary clamp located between the leading and trailing ends of said slide member and adapted to engage said web to restrain the movement thereof. The slide member carries a web severing device along its leading end which is actuated when the slide member is in its advanced position. A swingable filter transfer member is disposed at the advanced position of the slide member, receives the severed filter element and transports it to the waiting brew receptacle as aforesaid.

Other features of the present invention will become apparent from the detailed description of the embodiment thereof as hereinafter set forth.

Referring now to the drawings which illustrate a preferred embodiment of the present invention, and particularly FIGURES 1 and 2, reference numeral 10 designates generally the improved apparatus which includes a cabinet 11 in which the various components and assemblies of the apparatus are suitably housed and mounted. The apparatus comprises a storage compartment 12 supporting a roll R of filter material web W in the upper part of the cabinet 11, a web feeding, indexing and severing device 13 disposed below the storage compartment 12, and a filter element transfer mechanism 14, in turn disposed below the web indexing and severing device 13. Adjacent to and in alignment with transfer mechanism 14 is a brew assembly 16 which includes a cycle sequence control and motivating mechanism 17. A coffee metering hopper 18 is located above brew assembly 16. A hot water tank and feed water metering device 19 is disposed adjacent brew assembly 16 and a beverage air separator 20 is located in the upper part of cabinet 11.

Storage compartment 12 (FIGURE 2) includes a vertical side wall 110, a bottom wall 111 downwardly inclined toward side wall 110 and spaced therefrom by a transverse exit slot 112 and forming an acute angle therewith, a top wall and an opposite side wall. The compartment walls are provided with inwardly directed flanges 113 which retain the roll R of filter material within the compartment 12. The filter material is a band or web W of somewhat greater width than the brew receptacle, and is formed of any suitable filter material such as cotton, rayon, paper or the like. The filter web W is withdrawn from roll R through a depending guide channel 114 vertically aligned with exit slot 112, and a uniform restraining tension is applied thereto by reason of the wedging action of roll R in the dihedral defined by compartment walls 110 and 111. As web W is pulled from the roll R it is urged against wall 110 not only by reason of the weight of the roll but likewise by the rotation of the roll R toward wall 110 thereby to effect a wedging action on roll R.

The filter element preparing mechanism 13 (FIGURE 3 to 10) is carried by a vertical support plate 116 suitably mounted along a side wall of cabinet 11, and is provided with forwardly directed horizontal bracket lugs 117 which support a pair of transversely spaced vertical track defining guide rods 118. An indexing slide member 119 is of channel shape and comprises a vertical base plate 120 disposed forward of support plate 116 and along the rear of guide rods 118, and is provided with forwardly directed flanges 121 along its longitudinal edges. Projecting outwardly from flanges 121 at their upper ends and at intermediate points are bracket lugs 122 having openings registering with guide rods 118 to permit slide member 119 to move between an upper retracted position and a lower advance position, as seen in FIGURES 5 and 6 of the drawings respectively.

Formed in the lower section of slide base plate 120 is a vertically extending, medially located slot 123. A U-shaped jaw element 124 is affixed to the support plate 116 and is provided with a pad-defining vertical arm 126 registering with slot 123, and being substantially coplanar with slide plate 120. A vertically extending web hold-down arm 127 is medially disposed relative to slide member 119 and includes an upper rearwardly directed angle section 128 secured at its crotch to a transverse rod 129, rotatably supported by and between a pair of lugs 130 mounted on legs directed forwardly from the upper edge of support plate 116. Depending from the forward edge of angle section 128 is a vertical arm 131 which is connected by an inclined arm to a vertical leg 132 which is gravity urged to bear against the confronting faces of slide base plate 120 and pad member 126 and terminates below pad member 126. Filter web W traverses a path extending along the rear face of the angle section vertical leg, and between and in sandwiched engagement with the confronting faces of hold-down leg 132 and base plate 120, and hold-down leg 132 and pad member 126, whereby to maintain the web W at all times in position suitable for advancing and handling.

A channel shaped web engaging member 133 is swingably carried by slide base member 120, and comprises across web 134 provided with rearwardly directed longitudinal flanges 136 abutting the inner faces of base member flanges 121, and pivotally connected to the upper forward corners thereof by a transversely extending rod 137 registering with aligned openings formed in the flanges. Spaced below the lower corners of cross web 134 and suitably secured thereto (FIGURES 3 to 6) are a pair of transversely spaced web grip elements 138 terminating in rearwardly located arms 139 covered with caps 140 formed of a resilient friction material such as rubber. A bracket 141 is secured to and extends across the front face of web 134 between the upper and lower ends thereof, and is provided with an outwardly forwardly projecting end arm 142 terminating in outwardly directed ears 143. A pair of tension springs 144 are connected between ears 143 and slide bracket lugs 122, normally to urge the clamp member 133 resiliently to its tape clamping position and web grip elements 138 toward engagement with the lower border of the slide base plate 120.

The mechanism for reciprocating indexing slide 119 between its advanced and retracted position comprises a lever 146 having rearwardly and forwardly offset legs 147 and 148 respectively, and pivoted between its ends to a stationary horizontal post 149 disposed along the side of mounting plate 116. Arm 147 extends between plates 116 and 120 and terminates in a forked end which engages a rearwardly directed pin 150 mounted along the far edge of slide base plate 120. The free end of lever arm 148 is connected by a vertical link 151 to one end of a rocker arm 152 (FIGURES 1 and 11) pivoted between its ends to a horizontal support post 153 projecting from wall 22. The opposite end of rocker arm 152 carries a cam follower 154 which engages cam C2, and is urged into engagement therewith by the weight of index slide 119 transmitted by way of lever 146, link 151 and rocker arm 152. Cam C2 is provided with a raised and depressed section and is so shaped and angularly related to cam C6 that the raised section of the cam C2 engages follower 154 between the time the cam follower 61 engages cam section 3C6 and 4C6, that is during the coffee brewing period, and the depressed section of cam C2 engages follower 154 from the time follower 61 engages cam section 1C6 until it engages about the mid-point of cam section 2C6.

The web clamping plate 133 is rocked between a web engage and a web disengage position by a swingable arm 156 depending from and affixed to a crank shaft 157 journalled between slide flanges 121 (FIGURES 3 and 4). Shaft 157 projects beyond flange 121 and carries a depending radial arm 158 provided with an outwardly directed eccentric pin 159. Pin 159 is urged into sliding engagement with the front face of a vertical channel shaped bar 160 which is mounted along the vertical path thereof to wall 116 by a parallelogram linkage which permits the transverse movement of bar 160 while maintaining a vertical orientation. Specifically, channel bar 160 is connected by a pair of vertically spaced, parallel, rearwardly directed links 161 to a bracket 162 mounted on wall 116, links 161 being pivotally connected at their ends to bracket 162 and bar 160. Bar 160 and bracket 162 are formed of similarly shaped channels, and links 161 are likewise channel shaped.

Bar 160 is pivotally connected to the upper end of a vertical link 163, the lower end of which is connected to one end of a lever 164 pivoted between its ends to a horizontal post 165 mounted on wall 22. Lever 164 carries a cam follower 166 which bears against the under edge of cam C3. Cam C3 is so shaped and angularly oriented that its raised section engages follower 166 only during the upward movement of indexing slide 119 whereby, during this upward movement, web clamping elements 138 are in their retracted web disengage position as affected by arm 156 by way of lever 164, link 163, bar 160 and crank pin 159.

In order to cut a filter element F from web W, there is provided a transverse bed plate 167 secured to the rear face of slide plate 120 and depending below the lower edge of plate 120 and extending beyond the side edges thereof. Plate 167 has formed therein a longitudinally extending slot 168 immediately below the lower edge of slide plate 120 and extending substantially beyond the edges of the slide plate.

A pair of parallel plate brackets 169 project forwardly from the side edges of bed plate 167 and are reinforced by top plates 170 secured to the upper edges of bed plate 167 and plate bracket 169, and to the slide plate flanges 121 by upright ears 171. Supported by and between brackets 169 adjacent their forward edges and at the level of slot 168 is a guide rod 172 carrying at its left end as viewed in FIGURE 3 a stop member defining sleeve 173, and at its right end a bumper-defining helical spring 174.

Slidably carried by guide rod 172 is a carriage 176 including a rectangular base plate 177 provided with upright parallel ears 178 along its forward side edges, ears 178 having circular apertures formed therein registering with guide rod 172. A lug 179 is directed upwardly from the leading edge of base plate 177 and carries a headed pivot pin 180. Mounted on the top face of base plate 177, along its rear edge, is a blade support block 181 having a rectangular transverse recess formed along its rear upper edge which, in turn, has a clamp bar 182 registering therewith. A headed lock screw 183 has a threaded shank registering with aligned openings formed in plate 177 and block 181 and engages a tapped bore formed in clamp bar 182 to permit tightening thereof. A cutting blade 184 has a trailing section releasably clamped between block 181 and bar 182, and a forwardly directed angled cutting edge 186 projecting through and across bed plate slot 168 and forming an acute angle with the longitudinal axis thereof.

The cutter motivating mechanism includes a swingable vertical lever 187 pivoted at a point below its upper end to a cross bar 188 supported by side legs 189 secured to slide plate flanges 121. The lower section of lever 187 is forwardly offset, and terminates in a yoke 190 which straddles pin 180. A solenoid 191 (FIGURE 7) is mounted on a bracket plate 192 supported by slide member 119 by means of a laterally projecting arm 193. Motivated by solenoid 191 is a retractable plunger or armature 194 which is connected by a rod 196 to lever 187 below the pivot point thereof. The upper end of lever 187 is connected by a tension spring 197 to a lug 198 carried by an arm 199 projecting laterally from bracket leg 189 to urge lever 187 clockwise, as viewed in FIGURE 3 of the drawing, and to transport carriage 176 and blade 184 to its retracted position. Upon energization of solenoid 191, armature 194 is retracted to swing lever 187 counterclockwise and rapidly move the carriage carried blade 184 along slot 168 to its advanced position, and upon deenergization of solenoid 191 spring 197 rapidly returns blade 184 to its retracted position by way of lever 187 and withdraws armature 194 from solenoid 191. Spring bumper 174 absorbs the shock of the advancing carriage at the terminus of its advance stroke.

While there has been described and illustrated a preferred embodiment of the present invention, it is apparent that numerous alterations, omissions and additions may be made without departing from the spirit thereof.

What is claimed is:

1. A filter element forming and dispensing apparatus comprising a slide member movable between a lower advanced and an upper retracted position, and including a longitudinally extending plate having a vertically extending longitudinal slot formed therein, guide means directing a web of filter material along a path overlying said plate, web clamp means disposed adjacent to the leading end of said slide member, means for urging said web clamp means toward engagement with said slide member during the advance movement thereof and out of engagement with said slide member during the retraction thereof, a stationary clamp registering with said longitudinal slot and located between the leading and trailing ends of said slide member and for engaging said web to restrain the movement thereof and including a pair of jaw members, one of which is supported for movement toward and away from the other jaw member and being normally urged toward engagement therewith, severing means carried by and moveable with said slide member and disposed in the vicinity of the lower edge of said plate and adapted to cut said web transversely thereof, and means for actuating said cutting means when the slide is in its lower position.

2. A filter element forming and dispensing apparatus comprising a vertical slide member vertically movable between an upper and a lower position, guide means directing a web of filter material downwardly along said slide member, web clamp means disposed adjacent the lower end of said slide member and movable therewith, means for urging said web clamp means toward engagement with said slide member during the downward movement thereof and out of engagement with said slide member during the upward movement thereof, stationary web clamp means located above said movable web clamp means, severing means carried by and movable with said slide member and disposed in the vicinity of the lower edge of said slide member and adapted to transversely cut said web and means for actuating said severing means when said slide member is disposed in its lower position.

3. An apparatus according to claim 2 wherein said slide member has a transversely extending slot formed adjacent the leading edge thereof and said severing means includes a blade element movable along said slot between an advanced and retracted position beyond the side edges of said web, and solenoid means for motivating said blade element when said slide member is in its lower position.

References Cited by the Examiner
UNITED STATES PATENTS

| | | | |
|---|---|---|---|
| 2,128,964 | 9/1938 | Pityo | 226—149 |
| 2,168,415 | 8/1939 | Laukhuff | 83—277 |
| 2,222,528 | 11/1940 | Chilton | 83—455 |
| 2,311,452 | 2/1943 | Maurer | 83—277 |
| 2,353,405 | 7/1944 | King | 83—277 |
| 2,468,620 | 4/1949 | Gilbert | 83—277 |
| 2,515,354 | 7/1950 | Osborne | 83—277 |
| 2,633,878 | 4/1953 | Forslin | 226—162 |
| 2,634,974 | 4/1953 | Chuy | 226—162 |
| 2,815,075 | 12/1957 | Braunstein | 83—575 |
| 2,831,684 | 4/1958 | Cundall | 83—161 |

WILLIAM W. DYER, Jr., *Primary Examiner.*
ANDREW R. JUHASZ, *Examiner.*